United States Patent
Cooper

(10) Patent No.: US 8,449,814 B2
(45) Date of Patent: May 28, 2013

(54) SYSTEMS AND METHODS FOR MELTING SCRAP METAL

(76) Inventor: Paul V. Cooper, Chesterland, OH (US)

( * ) Notice: Subject to any disclaimer, the term of this patent is extended or adjusted under 35 U.S.C. 154(b) by 0 days.

(21) Appl. No.: 12/853,201

(22) Filed: Aug. 9, 2010

(65) Prior Publication Data

US 2011/0133374 A1  Jun. 9, 2011

Related U.S. Application Data

(60) Provisional application No. 61/232,392, filed on Aug. 7, 2009.

(51) Int. Cl.
*C21B 3/00* (2006.01)

(52) U.S. Cl.
USPC .................................. 266/216; 266/275

(58) Field of Classification Search
USPC ......................... 266/275, 216, 233
See application file for complete search history.

(56) References Cited

U.S. PATENT DOCUMENTS

| | | |
|---|---|---|
| 35,604 A | 6/1862 | Guild |
| 116,797 A | 7/1871 | Barnhart |
| 209,219 A | 10/1878 | Bookwalter |
| 251,104 A | 12/1881 | Finch |
| 364,804 A | 6/1887 | Cole |
| 390,319 A | 10/1888 | Thomson |
| 495,760 A | 4/1893 | Seitz |
| 506,572 A | 10/1893 | Wagener |
| 585,188 A | 6/1897 | Davis |
| 757,932 A | 4/1904 | Jones |
| 882,477 A | 3/1908 | Neumann |
| 882,478 A | 3/1908 | Neumann |
| 890,319 A | 6/1908 | Wells |
| 898,499 A | 9/1908 | O'Donnell |
| 909,774 A | 1/1909 | Flora |
| 919,194 A | 4/1909 | Livingston |
| 1,037,659 A | 9/1912 | Rembert |
| 1,100,475 A | 6/1914 | Franckaerts |
| 1,196,758 A | 9/1916 | Blair |
| 1,331,997 A | 2/1920 | Neal |
| 1,377,101 A | 5/1921 | Sparling |
| 1,380,798 A | 6/1921 | Hansen et al. |

(Continued)

FOREIGN PATENT DOCUMENTS

| | | |
|---|---|---|
| CA | 683469 | 3/1964 |
| CA | 2115929 | 8/1992 |

(Continued)

OTHER PUBLICATIONS

USPTO; Office Action dated Nov. 28, 2011 in U.S. Appl. No. 12/120,190.

(Continued)

*Primary Examiner* — Scott Kastler
(74) *Attorney, Agent, or Firm* — Snell & Wilmer L.L.P.

(57) ABSTRACT

A scrap submergence vessel for melting scrap metal is disclosed. The vessel comprises a front wall comprising an inlet, a back wall (opposite the front wall) comprising an outlet, and a flow direction member that causes molten metal flowing into the inlet to be directed at least partially upward against a portion of the back wall. The movement of molten metal through the vessel creates a downward pull that draws metal scrap placed above or within the vessel downward into the molten metal bath where it melts.

16 Claims, 9 Drawing Sheets

U.S. PATENT DOCUMENTS

| | | | |
|---|---|---|---|
| 1,439,365 A | 12/1922 | Hazell | |
| 1,454,967 A | 5/1923 | Gill | |
| 1,470,607 A | 10/1923 | Hazell | |
| 1,513,875 A | 11/1924 | Wilke | |
| 1,518,501 A | 12/1924 | Gill | |
| 1,522,765 A | 1/1925 | Wilke | |
| 1,526,851 A | 2/1925 | Hall | |
| 1,669,668 A | 5/1928 | Marshall | |
| 1,673,594 A | 6/1928 | Schmidt | |
| 1,697,202 A | 1/1929 | Nagle | |
| 1,717,969 A | 6/1929 | Goodner | |
| 1,718,396 A | 6/1929 | Wheeler | |
| 1,896,201 A | 2/1933 | Sterner-Rainer | |
| 1,988,875 A | 1/1935 | Saborio | |
| 2,013,455 A | 9/1935 | Baxter | |
| 2,038,221 A | 4/1936 | Kagi | |
| 2,090,162 A | 8/1937 | Tighe | |
| 2,091,677 A | 8/1937 | Fredericks | |
| 2,138,814 A | 12/1938 | Bressler | |
| 2,173,377 A | 9/1939 | Schultz, Jr. et al. | |
| 2,264,740 A * | 12/1941 | Brown | 75/585 |
| 2,280,979 A | 4/1942 | Rocke | |
| 2,290,961 A | 7/1942 | Heuer | |
| 2,300,688 A | 11/1942 | Nagle | |
| 2,304,849 A | 12/1942 | Ruthman | |
| 2,368,962 A | 2/1945 | Blom | |
| 2,383,424 A | 8/1945 | Stepanoff | |
| 2,423,655 A | 7/1947 | Mars et al. | |
| 2,488,447 A | 11/1949 | Tangen et al. | |
| 2,493,467 A | 1/1950 | Sunnen | |
| 2,515,097 A | 7/1950 | Schryber | |
| 2,515,478 A | 7/1950 | Tooley et al. | |
| 2,528,208 A | 10/1950 | Bonsack et al. | |
| 2,528,210 A | 10/1950 | Stewart | |
| 2,543,633 A | 2/1951 | Lamphere | |
| 2,566,892 A | 9/1951 | Jacobs | |
| 2,625,720 A | 1/1953 | Ross | |
| 2,626,086 A | 1/1953 | Forrest | |
| 2,676,279 A | 4/1954 | Wilson | |
| 2,677,609 A | 5/1954 | Moore et al. | |
| 2,698,583 A | 1/1955 | House et al. | |
| 2,714,354 A | 8/1955 | Farrand | |
| 2,762,095 A | 9/1956 | Pemetzrieder | |
| 2,768,587 A | 10/1956 | Corneil | |
| 2,775,348 A | 12/1956 | Williams | |
| 2,779,574 A | 1/1957 | Schneider | |
| 2,787,873 A | 4/1957 | Hadley | |
| 2,808,782 A | 10/1957 | Thompson et al. | |
| 2,809,107 A | 10/1957 | Russell | |
| 2,821,472 A | 1/1958 | Peterson et al. | |
| 2,824,520 A | 2/1958 | Bartels | |
| 2,832,292 A | 4/1958 | Edwards | |
| 2,853,019 A | 9/1958 | Thorton | |
| 2,865,618 A | 12/1958 | Abell | |
| 2,901,677 A | 8/1959 | Chessman et al. | |
| 2,906,632 A | 9/1959 | Nickerson | |
| 2,918,876 A | 12/1959 | Howe | |
| 2,948,524 A | 8/1960 | Sweeney et al. | |
| 2,958,293 A | 11/1960 | Pray, Jr. | |
| 2,978,885 A | 4/1961 | Davison | |
| 2,984,524 A | 5/1961 | Franzen | |
| 2,987,885 A | 6/1961 | Hodge | |
| 3,010,402 A | 11/1961 | King | |
| 3,015,190 A | 1/1962 | Arbeit | |
| 3,039,864 A | 6/1962 | Hess | |
| 3,044,408 A | 7/1962 | Mellott | |
| 3,048,384 A | 8/1962 | Sweeney et al. | |
| 3,070,393 A | 12/1962 | Silverberg et al. | |
| 3,092,030 A | 6/1963 | Wunder | |
| 3,099,870 A | 8/1963 | Seeler | |
| 3,130,678 A | 4/1964 | Chenault | |
| 3,130,679 A | 4/1964 | Sence | |
| 3,171,357 A | 3/1965 | Egger | |
| 3,203,182 A | 8/1965 | Pohl | |
| 3,227,547 A | 1/1966 | Szekely | |
| 3,244,109 A | 4/1966 | Barske | |
| 3,251,676 A | 5/1966 | Johnson | |
| 3,255,702 A | 6/1966 | Gehrm | |
| 3,258,283 A | 6/1966 | Winberg et al. | |
| 3,272,619 A | 9/1966 | Sweeney et al. | |
| 3,289,473 A | 12/1966 | Louda | |
| 3,289,743 A | 12/1966 | Louda | |
| 3,291,473 A | 12/1966 | Sweeney et al. | |
| 3,374,943 A | 3/1968 | Cervenka | |
| 3,400,923 A | 9/1968 | Howie et al. | |
| 3,417,929 A | 12/1968 | Secrest et al. | |
| 3,432,336 A | 3/1969 | Langrod | |
| 3,459,133 A | 8/1969 | Scheffler | |
| 3,459,346 A | 8/1969 | Tinnes | |
| 3,477,383 A | 11/1969 | Rawson et al. | |
| 3,487,805 A | 1/1970 | Satterthwaite | |
| 1,185,314 A | 3/1970 | London | |
| 3,512,762 A | 5/1970 | Umbricht | |
| 3,512,788 A | 5/1970 | Kilbane | |
| 3,561,885 A | 2/1971 | Lake | |
| 3,575,525 A | 4/1971 | Fox et al. | |
| 3,618,917 A | 11/1971 | Fredrikson | |
| 3,620,716 A | 11/1971 | Hess | |
| 3,650,730 A | 3/1972 | Derham et al. | |
| 3,689,048 A | 9/1972 | Foulard et al. | |
| 3,715,112 A | 2/1973 | Carbonnel | |
| 3,732,032 A | 5/1973 | Daneel | |
| 3,737,304 A | 6/1973 | Blayden | |
| 3,737,305 A | 6/1973 | Blayden et al. | |
| 3,743,263 A | 7/1973 | Szekely | |
| 3,743,500 A | 7/1973 | Foulard et al. | |
| 3,753,690 A | 8/1973 | Emley et al. | |
| 3,759,628 A | 9/1973 | Kempf | |
| 3,759,635 A | 9/1973 | Carter et al. | |
| 3,767,382 A | 10/1973 | Bruno et al. | |
| 3,776,660 A | 12/1973 | Anderson et al. | |
| 3,785,632 A | 1/1974 | Kraemer et al. | |
| 3,787,143 A | 1/1974 | Carbonnel et al. | |
| 3,799,522 A | 3/1974 | Brant et al. | |
| 3,799,523 A | 3/1974 | Seki | |
| 3,807,708 A | 4/1974 | Jones | |
| 3,814,400 A | 6/1974 | Seki | |
| 3,824,028 A | 7/1974 | Zenkner et al. | |
| 3,824,042 A | 7/1974 | Barnes et al. | |
| 3,836,280 A | 9/1974 | Koch | |
| 3,839,019 A | 10/1974 | Bruno et al. | |
| 3,844,972 A | 10/1974 | Tully, Jr. et al. | |
| 3,871,872 A | 3/1975 | Downing et al. | |
| 3,873,073 A | 3/1975 | Baum et al. | |
| 3,873,305 A | 3/1975 | Claxton et al. | |
| 3,881,039 A | 4/1975 | Baldieri et al. | |
| 3,886,992 A | 6/1975 | Maas et al. | |
| 3,915,594 A | 10/1975 | Nesseth | |
| 3,915,694 A | 10/1975 | Ando | |
| 3,941,588 A | 3/1976 | Dremann | |
| 3,941,589 A | 3/1976 | Norman et al. | |
| 3,954,134 A | 5/1976 | Maas et al. | |
| 3,958,979 A | 5/1976 | Valdo | |
| 3,958,981 A | 5/1976 | Forberg et al. | |
| 3,961,778 A | 6/1976 | Carbonnel et al. | |
| 3,966,456 A | 6/1976 | Ellenbaum et al. | |
| 3,972,709 A | 8/1976 | Chia et al. | |
| 3,976,286 A | 8/1976 | Thompson et al. | |
| 3,984,234 A | 10/1976 | Claxton et al. | |
| 3,985,000 A | 10/1976 | Hartz | |
| 3,997,336 A * | 12/1976 | van Linden et al. | 75/687 |
| 4,003,560 A | 1/1977 | Carbonnel | |
| 4,008,884 A | 2/1977 | Fitzpatrick et al. | |
| 4,018,598 A | 4/1977 | Markus | |
| 4,052,199 A | 10/1977 | Mangalick | |
| 4,055,390 A | 10/1977 | Young | |
| 4,063,849 A | 12/1977 | Modianos | |
| 4,068,965 A | 1/1978 | Lichti | |
| 4,091,970 A | 5/1978 | Kimiyama et al. | |
| 4,119,141 A | 10/1978 | Thut et al. | |
| 4,126,360 A | 11/1978 | Miller et al. | |
| 4,128,415 A | 12/1978 | van Linden et al. | |
| 4,169,584 A | 10/1979 | Mangalick | |
| 4,191,486 A | 3/1980 | Pelton | |
| 4,213,742 A | 7/1980 | Henshaw | |
| 4,242,039 A | 12/1980 | Villard et al. | |
| 4,244,423 A | 1/1981 | Thut et al. | |

| Patent No. | Date | Inventor |
|---|---|---|
| 4,286,985 A | 9/1981 | van Linden et al. |
| 4,305,214 A | 12/1981 | Hurst |
| 4,322,245 A | 3/1982 | Claxton |
| 4,338,062 A | 7/1982 | Neal |
| 4,347,041 A | 8/1982 | Cooper |
| 4,351,514 A | 9/1982 | Koch |
| 4,355,789 A | 10/1982 | Dolzhenkov et al. |
| 4,360,314 A | 11/1982 | Pennell |
| 4,370,096 A | 1/1983 | Church |
| 4,372,541 A | 2/1983 | Bocourt et al. |
| 4,375,937 A | 3/1983 | Cooper |
| 4,389,159 A | 6/1983 | Sarvanne |
| 4,392,888 A | 7/1983 | Eckert et al. |
| 4,410,299 A | 10/1983 | Shimoyama |
| 4,419,049 A | 12/1983 | Gerboth et al. |
| 4,456,424 A | 6/1984 | Araoka |
| 4,470,846 A | 9/1984 | Dube |
| 4,474,315 A | 10/1984 | Gilbert et al. |
| 4,496,393 A | 1/1985 | Lustenberger |
| 4,504,392 A | 3/1985 | Groteke |
| 4,537,624 A | 8/1985 | Tenhover et al. |
| 4,537,625 A | 8/1985 | Tenhover et al. |
| 4,556,419 A | 12/1985 | Otsuka et al. |
| 4,557,766 A | 12/1985 | Tenhover et al. |
| 4,586,845 A | 5/1986 | Morris |
| 4,592,700 A | 6/1986 | Toguchi et al. |
| 4,594,052 A | 6/1986 | Niskanen |
| 4,598,899 A | 7/1986 | Cooper |
| 4,600,222 A | 7/1986 | Appling |
| 4,607,825 A | 8/1986 | Briolle et al. |
| 4,609,442 A | 9/1986 | Tenhover et al. |
| 4,611,790 A | 9/1986 | Otsuka et al. |
| 4,617,232 A | 10/1986 | Chandler et al. |
| 4,634,105 A | 1/1987 | Withers et al. |
| 4,640,666 A | 2/1987 | Sodergard |
| 4,655,610 A | 4/1987 | Al-Jaroudi |
| 4,684,281 A | 8/1987 | Patterson |
| 4,685,822 A | 8/1987 | Pelton |
| 4,696,703 A | 9/1987 | Henderson et al. |
| 4,701,226 A | 10/1987 | Henderson et al. |
| 4,702,768 A | 10/1987 | Areauz et al. |
| 4,714,371 A | 12/1987 | Cuse |
| 4,717,540 A | 1/1988 | McRae et al. |
| 4,739,974 A | 4/1988 | Mordue |
| 4,743,428 A | 5/1988 | McRae et al. |
| 4,747,583 A | 5/1988 | Gordon et al. |
| 4,767,230 A | 8/1988 | Leas, Jr. |
| 4,770,701 A | 9/1988 | Henderson et al. |
| 4,786,230 A | 11/1988 | Thut |
| 4,802,656 A | 2/1989 | Hudault et al. |
| 4,804,168 A | 2/1989 | Otsuka et al. |
| 4,810,314 A | 3/1989 | Henderson et al. |
| 4,834,573 A | 5/1989 | Asano et al. |
| 4,842,227 A | 6/1989 | Harrington et al. |
| 4,844,425 A | 7/1989 | Piras et al. |
| 4,851,296 A | 7/1989 | Tenhover et al. |
| 4,859,413 A | 8/1989 | Harris et al. |
| 4,867,638 A | 9/1989 | Handtmann et al. |
| 4,884,786 A | 12/1989 | Gillespie |
| 4,898,367 A | 2/1990 | Cooper |
| 4,908,060 A | 3/1990 | Duenkelmann |
| 4,923,770 A | 5/1990 | Grasselli et al. |
| 4,930,986 A | 6/1990 | Cooper |
| 4,931,091 A | 6/1990 | Waite et al. |
| 4,940,214 A | 7/1990 | Gillespie |
| 4,940,384 A | 7/1990 | Amra et al. |
| 4,954,167 A | 9/1990 | Cooper |
| 4,973,433 A | 11/1990 | Gilbert et al. |
| 4,986,736 A | 1/1991 | Kajiwara |
| 4,989,736 A | 2/1991 | Andersson et al. |
| 5,015,518 A | 5/1991 | Sasaki et al. |
| 5,025,198 A | 6/1991 | Mordue et al. |
| 5,028,211 A | 7/1991 | Mordue et al. |
| 5,029,821 A | 7/1991 | Bar-on et al. |
| 5,078,572 A | 1/1992 | Amra et al. |
| 5,080,715 A | 1/1992 | Provencher et al. |
| 5,088,893 A | 2/1992 | Gilbert et al. |
| 5,092,821 A | 3/1992 | Gilbert et al. |
| 5,098,134 A | 3/1992 | Monckton |
| 5,114,312 A | 5/1992 | Stanislao |
| 5,126,047 A | 6/1992 | Martin et al. |
| 5,131,632 A | 7/1992 | Olson |
| 5,143,357 A | 9/1992 | Gilbert et al. |
| 5,145,322 A | 9/1992 | Senior, Jr. et al. |
| 5,152,631 A | 10/1992 | Bauer |
| 5,154,652 A | 10/1992 | Ecklesdafer |
| 5,158,440 A | 10/1992 | Cooper et al. |
| 5,162,858 A | 11/1992 | Shoji et al. |
| 5,165,858 A | 11/1992 | Gilbert et al. |
| 5,177,304 A | 1/1993 | Nagel |
| 5,191,154 A | 3/1993 | Nagel |
| 5,192,193 A | 3/1993 | Cooper et al. |
| 5,202,100 A | 4/1993 | Nagel et al. |
| 5,203,681 A | 4/1993 | Cooper |
| 5,209,641 A | 5/1993 | Hoglund et al. |
| 5,215,448 A | 6/1993 | Cooper |
| 5,268,020 A | 12/1993 | Claxton |
| 5,286,163 A | 2/1994 | Amra et al. |
| 5,298,233 A | 3/1994 | Nagel |
| 5,301,620 A | 4/1994 | Nagel et al. |
| 5,308,045 A | 5/1994 | Cooper |
| 5,310,412 A | 5/1994 | Gilbert et al. |
| 5,318,360 A | 6/1994 | Langer et al. |
| 5,322,547 A | 6/1994 | Nagel et al. |
| 5,324,341 A | 6/1994 | Nagel et al. |
| 5,330,328 A | 7/1994 | Cooper |
| 5,354,940 A | 10/1994 | Nagel |
| 5,358,549 A | 10/1994 | Nagel et al. |
| 5,358,697 A | 10/1994 | Nagel |
| 5,364,078 A | 11/1994 | Pelton |
| 5,369,063 A | 11/1994 | Gee et al. |
| 5,388,633 A | 2/1995 | Mercer, II et al. |
| 5,395,405 A | 3/1995 | Nagel et al. |
| 5,399,074 A | 3/1995 | Nose et al. |
| 5,407,294 A | 4/1995 | Giannini |
| 5,411,240 A | 5/1995 | Rapp et al. |
| 5,425,410 A | 6/1995 | Reynolds |
| 5,431,551 A | 7/1995 | Aquino et al. |
| 5,435,982 A | 7/1995 | Wilkinson |
| 5,436,210 A | 7/1995 | Wilkinson et al. |
| 5,443,572 A | 8/1995 | Wilkinson et al. |
| 5,454,423 A | 10/1995 | Tsuchida et al. |
| 5,468,280 A | 11/1995 | Areaux |
| 5,470,201 A | 11/1995 | Gilbert et al. |
| 5,484,265 A | 1/1996 | Horvath et al. |
| 5,489,734 A | 2/1996 | Nagel et al. |
| 5,491,279 A | 2/1996 | Robert et al. |
| 5,495,746 A | 3/1996 | Sigworth |
| 5,505,143 A | 4/1996 | Nagel |
| 5,509,791 A | 4/1996 | Turner |
| 5,537,940 A | 7/1996 | Nagel et al. |
| 5,543,558 A | 8/1996 | Nagel et al. |
| 5,555,822 A | 9/1996 | Loewen et al. |
| 5,558,501 A | 9/1996 | Wang et al. |
| 5,558,505 A | 9/1996 | Mordue et al. |
| 5,571,486 A | 11/1996 | Robert et al. |
| 5,585,532 A | 12/1996 | Nagel |
| 5,586,863 A | 12/1996 | Gilbert et al. |
| 5,591,243 A | 1/1997 | Colussi et al. |
| 5,597,289 A | 1/1997 | Thut |
| 5,613,245 A | 3/1997 | Robert |
| 5,616,167 A | 4/1997 | Eckert |
| 5,622,481 A | 4/1997 | Thut |
| 5,629,464 A | 5/1997 | Bach et al. |
| 5,634,770 A | 6/1997 | Gilbert et al. |
| 5,640,706 A | 6/1997 | Nagel et al. |
| 5,640,707 A | 6/1997 | Nagel et al. |
| 5,640,709 A | 6/1997 | Nagel et al. |
| 5,655,849 A | 8/1997 | McEwen et al. |
| 5,662,725 A | 9/1997 | Cooper |
| 5,676,520 A | 10/1997 | Thut |
| 5,678,244 A | 10/1997 | Shaw et al. |
| 5,678,807 A | 10/1997 | Cooper |
| 5,679,132 A | 10/1997 | Rauenzahn et al. |
| 5,685,701 A | 11/1997 | Chandler et al. |
| 5,690,888 A | 11/1997 | Robert |
| 5,695,732 A | 12/1997 | Sparks et al. |
| 5,716,195 A | 2/1998 | Thut |

| | | | | | | |
|---|---|---|---|---|---|---|
| 5,717,149 A | 2/1998 | Nagel et al. | | 7,402,276 B2 | 7/2008 | Cooper |
| 5,718,416 A | 2/1998 | Flisakowski et al. | | 7,470,392 B2 | 12/2008 | Cooper |
| 5,735,668 A | 4/1998 | Klein | | 7,476,357 B2 | 1/2009 | Thut |
| 5,735,935 A | 4/1998 | Areaux | | 7,497,988 B2 | 3/2009 | Thut |
| 5,741,422 A | 4/1998 | Eichenmiller et al. | | 7,507,367 B2 | 3/2009 | Cooper |
| 5,744,117 A | 4/1998 | Wilkinson et al. | | 8,110,141 B2 | 2/2012 | Cooper |
| 5,745,861 A | 4/1998 | Bell et al. | | 2001/0000465 A1 | 4/2001 | Thut |
| 5,772,324 A | 6/1998 | Falk | | 2002/0185794 A1 | 12/2002 | Vincent |
| 5,776,420 A | 7/1998 | Nagel | | 2003/0047850 A1 | 3/2003 | Areaux |
| 5,785,494 A | 7/1998 | Vild et al. | | 2003/0201583 A1 | 10/2003 | Klingensmith |
| 5,842,832 A | 12/1998 | Thut | | 2004/0050525 A1 | 3/2004 | Kennedy et al. |
| 5,858,059 A | 1/1999 | Abramovich et al. | | 2004/0076533 A1 | 4/2004 | Cooper |
| 5,863,314 A | 1/1999 | Morando | | 2004/0115079 A1 | 6/2004 | Cooper |
| 5,866,095 A | 2/1999 | McGeever et al. | | 2004/0262825 A1 | 12/2004 | Cooper |
| 5,875,385 A | 2/1999 | Stephenson et al. | | 2005/0013713 A1 | 1/2005 | Cooper |
| 5,935,528 A | 8/1999 | Stephenson et al. | | 2005/0013714 A1 | 1/2005 | Cooper |
| 5,944,496 A | 8/1999 | Cooper | | 2005/0013715 A1 | 1/2005 | Cooper |
| 5,947,705 A | 9/1999 | Mordue et al. | | 2005/0053499 A1 | 3/2005 | Cooper |
| 5,951,243 A | 9/1999 | Cooper | | 2005/0077730 A1 | 4/2005 | Thut |
| 5,963,580 A | 10/1999 | Eckert | | 2005/0116398 A1 | 6/2005 | Tremblay |
| 5,992,230 A | 11/1999 | Scarpa et al. | | 2006/0180963 A1 | 8/2006 | Thut |
| 5,993,726 A | 11/1999 | Huang et al. | | 2007/0253807 A1 | 11/2007 | Cooper |
| 5,993,728 A | 11/1999 | Vild | | 2008/0213111 A1 | 9/2008 | Cooper |
| 6,019,576 A | 2/2000 | Thut | | 2008/0230966 A1 | 9/2008 | Cooper |
| 6,027,685 A | 2/2000 | Cooper | | 2011/0140319 A1 | 6/2011 | Cooper |
| 6,036,745 A * | 3/2000 | Gilbert et al. ............... 75/686 | | | | |
| 6,074,455 A | 6/2000 | van Linden et al. | | FOREIGN PATENT DOCUMENTS | | |
| 6,082,965 A | 7/2000 | Morando | | | | |
| 6,093,000 A | 7/2000 | Cooper | | CA | 2176475 | 5/1996 |
| 6,096,109 A | 8/2000 | Nagel et al. | | CA | 2244251 | 12/1996 |
| 6,113,154 A | 9/2000 | Thut | | CA | 2305865 | 2/2000 |
| 6,123,523 A | 9/2000 | Cooper | | CH | 392268 | 9/1965 |
| 6,152,691 A | 11/2000 | Thut | | DE | 1800446 | 12/1969 |
| 6,168,753 B1 | 1/2001 | Morando | | EP | 0168250 | 1/1986 |
| 6,187,096 B1 | 2/2001 | Thut | | EP | 0665378 | 2/1995 |
| 6,199,836 B1 | 3/2001 | Rexford et al. | | EP | 1019635 | 6/2006 |
| 6,217,823 B1 | 4/2001 | Vild et al. | | GB | 942648 | 11/1963 |
| 6,231,639 B1 | 5/2001 | Eichenmiller | | GB | 1185314 | 3/1970 |
| 6,250,881 B1 | 6/2001 | Mordue et al. | | GB | 2217784 | 3/1989 |
| 6,254,340 B1 | 7/2001 | Vild et al. | | JP | 58048796 | 3/1983 |
| 6,270,717 B1 | 8/2001 | Tremblay et al. | | JP | 63104773 | 5/1988 |
| 6,280,157 B1 | 8/2001 | Cooper | | MX | 227385 | 4/2005 |
| 6,293,759 B1 | 9/2001 | Thut | | NO | 90756 | 1/1959 |
| 6,303,074 B1 | 10/2001 | Cooper | | RU | 416401 | 2/1974 |
| 6,345,964 B1 | 2/2002 | Cooper | | RU | 773312 | 10/1980 |
| 6,354,796 B1 | 3/2002 | Morando | | WO | WO9808990 | 3/1998 |
| 6,358,467 B1 | 3/2002 | Mordue | | WO | WO9825031 | 6/1998 |
| 6,371,723 B1 | 4/2002 | Grant et al. | | WO | 0009889 | 2/2000 |
| 6,398,525 B1 | 6/2002 | Cooper | | WO | 0212147 | 2/2002 |
| 6,439,860 B1 | 8/2002 | Greer | | | | |
| 6,451,247 B1 | 9/2002 | Mordue et al. | | OTHER PUBLICATIONS | | |
| 6,457,940 B1 | 10/2002 | Lehman | | | | |
| 6,457,950 B1 | 10/2002 | Cooper et al. | | USPTO; Notice of Allowance dated Nov. 1, 2011 in U.S. Appl. No. 12/146,770. | | |
| 6,464,458 B2 | 10/2002 | Vild et al. | | | | |
| 6,497,559 B1 | 12/2002 | Grant | | USPTO; Office Action dated Nov. 4, 2011 in U.S. Appl. No. 12/264,416. | | |
| 6,500,228 B1 | 12/2002 | Klingensmith | | | | |
| 6,503,292 B2 | 1/2003 | Klingensmith et al. | | USPTO; Final Office Action dated Dec. 16, 2011 in U.S. Appl. No. 13/047,719. | | |
| 6,524,066 B2 | 2/2003 | Thut | | | | |
| 6,533,535 B2 | 3/2003 | Thut | | USPTO; Office Action dated Feb. 23, 1996 in U.S. Appl. No. 08/439,739. | | |
| 6,551,060 B2 | 4/2003 | Mordue et al. | | | | |
| 6,562,286 B1 | 5/2003 | Lehman | | USPTO; Office Action dated Aug. 15, 1996 in U.S. Appl. No. 08/439,739. | | |
| 6,679,936 B2 | 1/2004 | Quackenbush | | | | |
| 6,689,310 B1 | 2/2004 | Cooper | | USPTO; Advisory Action dated Nov. 18, 1996 in U.S. Appl. No. 08/439,739. | | |
| 6,709,234 B2 | 3/2004 | Gilbert et al. | | | | |
| 6,723,276 B1 | 4/2004 | Cooper | | USPTO; Advisory Action dated Dec. 9, 1996 in U.S. Appl. No. 08/439,739. | | |
| 6,805,834 B2 | 10/2004 | Thut | | | | |
| 6,843,640 B2 | 1/2005 | Mordue et al. | | USPTO; Notice of Allowance dated Jan. 17, 1997 in U.S. Appl. No. 08/439,739. | | |
| 6,848,497 B2 | 2/2005 | Sale et al. | | | | |
| 6,869,271 B2 | 3/2005 | Gilbert et al. | | USPTO; Office Action dated Jul. 22, 1996 in U.S. Appl. No. 08/489,962. | | |
| 6,869,564 B2 | 3/2005 | Gilbert et al. | | | | |
| 6,881,030 B2 | 4/2005 | Thut | | USPTO; Office Action dated Jan. 6, 1997 in U.S. Appl. No. 08/489,962. | | |
| 6,887,424 B2 | 5/2005 | Ohno et al. | | | | |
| 6,887,425 B2 | 5/2005 | Mordue et al. | | USPTO; Interview Summary dated Mar. 4, 1997 in U.S. Appl. No. 08/489,962. | | |
| 6,902,696 B2 | 6/2005 | Klingensmith et al. | | | | |
| 7,083,758 B2 | 8/2006 | Tremblay | | USPTO; Notice of Allowance dated Mar. 27, 1997 in U.S. Appl. No. 08/489,962. | | |
| 7,131,482 B2 | 11/2006 | Vincent et al. | | | | |
| 7,157,043 B2 | 1/2007 | Neff | | USPTO; Office Action dated Sep. 23, 1998 in U.S. Appl. No. 08/759,780. | | |
| 7,279,128 B2 | 10/2007 | Kennedy et al. | | | | |
| 7,326,028 B2 | 2/2008 | Morando | | | | |

USPTO; Interview Summary dated Dec. 30, 1998 in U.S. Appl. No. 08/789,780.
USPTO; Notice of Allowance dated Mar. 17, 1999 in U.S. Appl. No. 08/789,780.
USPTO; Office Action dated Jul. 23, 1998 in U.S. Appl. No. 08/889,882.
USPTO; Office Action dated Jan. 21, 1999 in U.S. Appl. No. 08/889,882.
USPTO; Notice of Allowance dated Mar. 17, 1999 in U.S. Appl. No. 08/889,882.
USPTO; Office Action dated Feb. 26, 1999 in U.S. Appl. No. 08/951,007.
USPTO; Interview Summary dated Mar. 15, 1999 in U.S. Appl. No. 08/951,007.
USPTO; Office Action dated May 17, 1999 in U.S. Appl. No. 08/951,007.
USPTO; Notice of Allowance dated Aug. 27, 1999 in U.S. Appl. No. 08/951,007.
USPTO; Office Action dated Dec. 23, 1999 in U.S. Appl. No. 09/132,934.
USPTO; Notice of Allowance dated Mar. 9, 2000 in U.S. Appl. No. 09/132,934.
USPTO; Office Action dated Jan. 7, 2000 in U.S. Appl. No. 09/152,168.
USPTO; Notice of Allowance dated Aug. 7, 2000 in U.S. Appl. No. 09/152,168.
USPTO; Office Action dated Sep. 14, 1999 in U.S. Appl. No. 09/275,627.
USPTO; Office Action dated May 22, 2000 in U.S. Appl. No. 09/275,627.
USPTO; Office Action dated Nov. 14, 2000 in U.S. Appl. No. 09/275,627.
USPTO; Office Action dated May 21, 2001 in U.S. Appl. No. 09/275,627.
USPTO; Notice of Allowance dated Aug. 31, 2001 in U.S. Appl. No. 09/275,627.
USPTO; Office Action dated Jun. 15, 2000 in U.S. Appl. No. 09/312,361.
USPTO; Notice of Allowance dated Jan. 29, 2001 in U.S. Appl. No. 09/312,361.
USPTO; Office Action dated Jun. 22, 2001 in U.S. Appl. No. 09/569,461.
USPTO; Office Action dated Oct. 12, 2001 in U.S. Appl. No. 09/569,461.
USPTO; Office Action dated May 3, 2002 in U.S. Appl. No. 09/569,461.
USPTO; Advisory Action dated May 14, 2002 in U.S. Appl. No. 09/569,461.
USPTO; Office Action dated Dec. 4, 2002 in U.S. Appl. No. 09/569,461.
USPTO; Interview Summary dated Jan. 14, 2003 in U.S. Appl. No. 09/569,461.
USPTO; Notice of Allowance dated Jun. 24, 2003 in U.S. Appl. No. 09/569,461.
USPTO; Office Action dated Nov. 21, 2000 in U.S. Appl. No. 09/590,108.
USPTO; Office Action dated May 22, 2001 in U.S. Appl. No. 09/590,108.
USPTO; Notice of Allowance dated Sep. 10, 2001 in U.S. Appl. No. 09/590,108.
USPTO; Office Action dated Jan. 30, 2002 in U.S. Appl. No. 09/649,190.
USPTO; Office Action dated Oct. 4, 2002 in U.S. Appl. No. 09/649,190.
USPTO; Office Action dated Apr. 18, 2003 in U.S. Appl. No. 09/649,190.
USPTO; Notice of Allowance dated Nov. 21, 2003 in U.S. Appl. No. 09/649,190.
USPTO; Office Action dated Jun. 7, 2006 in U.S. Appl. No. 10/619,405.
USPTO; Final Office Action dated Feb. 20, 2007 in U.S. Appl. No. 10/619,405.
USPTO; Office Action dated Oct. 9, 2007 in U.S. Appl. No. 10/619,405.
USPTO; Final Office Action dated May 29, 2008 in U.S. Appl. No. 10/619,405.
USPTO; Interview Summary Aug. 22, 2008 in U.S. Appl. No. 10/619,405.
USPTO; Ex Parte Quayle dated Sep. 12, 2008 in U.S. Appl. No. 10/619,405.
USPTO; Interview Summary dated Oct. 16, 2008 in U.S. Appl. No. 10/619,405.
USPTO; Notice of Allowance dated Nov. 14, 2008 in U.S. Appl. No. 10/619,405.
USPTO; Office Action dated Mar. 20, 2006 in U.S. Appl. No. 10/620,318.
USPTO; Office Action dated Nov. 16, 2006 in U.S. Appl. No. 10/620,318.
USPTO; Final Office Action dated Jul. 25, 2007 in U.S. Appl. No. 10/620,318.
USPTO; Office Action dated Feb. 12, 2008 in U.S. Appl. No. 10/620,318.
USPTO; Final Office Action dated Oct. 16, 2008 in U.S. Appl. No. 10/620,318.
USPTO; Office Action dated Feb. 25, 2009 in U.S. Appl. No. 10/620,318.
USPTO; Final Office Action dated Oct. 8, 2009 in U.S. Appl. No. 10/620,318.
USPTO; Notice of Allowance Jan. 26, 2010 in U.S. Appl. No. 10/620,318.
USPTO; Office Action dated Nov. 15, 2007 in U.S. Appl. No. 10/773,101.
USPTO; Office Action dated Jun. 27, 2006 in U.S. Appl. No. 10/773,102.
USPTO; Office Action dated Mar. 6, 2007 in U.S. Appl. No. 10/773,102.
USPTO; Office Action dated Oct. 11, 2007 in U.S. Appl. No. 10/773,102.
USPTO; Interview Summary dated Mar. 18, 2008 in U.S. Appl. No. 10/773,102.
USPTO; Notice of Allowance Apr. 18, 2008 in U.S. Appl. No. 10/773,102.
USPTO; Office Action dated Jul. 24, 2006 in U.S. Appl. No. 10/773.105.
USPTO; Final Office Action dated Jul. 21, 2007 in U.S. Appl. No. 10/773.105.
USPTO; Office Action dated Oct. 9, 2007 in U.S. Appl. No. 10/773.105.
USPTO; Interview Summary dated Jan. 25, 2008 in U.S. Appl. No. 10/773,105.
USPTO; Office Action dated May 19, 2008 in U.S. Appl. No. 10/773.105.
USPTO; Interview Summary dated Jul. 21, 2008 in U.S. Appl. No. 10/773.105.
USPTO; Notice of Allowance dated Sep. 29, 2008 in U.S. Appl. No. 10/773.105.
USPTO; Office Action dated Jan. 31, 2008 in U.S. Appl. No. 10/773,118.
USPTO; Final Office Action dated Aug. 18, 2008 in U.S. Appl. No. 10/773,118.
USPTO; Interview Summary dated Oct. 16, 2008 in U.S. Appl. No. 10/773,118.
USPTO; Office Action dated Dec. 15, 2008 in U.S. Appl. No. 10/773,118.
USPTO; Final Office Action dated May 1, 2009 in U.S. Appl. No. 10/773,118.
USPTO; Office Action dated Jul. 27, 2009 in U.S. Appl. No. 10/773,118.
USPTO; Final Office Action dated Feb. 2, 2010 in U.S. Appl. No. 10/773,118.
USPTO; Interview Summary dated Jun. 4, 2010 in U.S. Appl. No. 10/773,118.
USPTO; Ex Parte Quayle Action dated Aug. 25, 2010 in U.S. Appl. No. 10/773,118.

USPTO; Notice of Allowance dated Nov. 5, 2010 in U.S. Appl. No. 10/773,118.
USPTO; Office Action dated Mar. 16, 2005 in U.S. Appl. No. 10/827,941.
USPTO; Final Office Action dated Nov. 7, 2005 in U.S. Appl. No. 10/827,941.
USPTO; Office Action dated Jul. 12, 2006 in U.S. Appl. No. 10/827,941.
USPTO; Final Office Action dated Mar. 8, 2007 in U.S. Appl. No. 10/827,941.
USPTO; Office Action dated Oct. 29, 2007 in U.S. Appl. No. 10/827,941.
USPTO; Office Action dated Sep. 26, 2008 in U.S. Appl. No. 11/413,982.
USPTO; Final Office Action dated Oct. 14, 2008 in U.S. Appl. No. 12/111,835.
USPTO; Office Action dated May 15, 2009 in U.S. Appl. No. 12/111,835.
USPTO; Office Action dated Nov. 3, 2008 in U.S. Appl. No. 12/120,200.
USPTO; Final Office Action dated May 28, 2009 in U.S. Appl. No. 12/120,200.
USPTO; Office Action dated Dec. 18, 2009 in U.S. Appl. No. 12/120,200.
USPTO; Final Office Action dated Jul. 9, 2010 in U.S. Appl. No. 12/120,200.
USPTO; Office Action dated Jan. 21, 2011 in U.S. Appl. No. 12/120,200.
USPTO; Final Office Action dated Jul. 26, 2011 in U.S. Appl. No. 12/120,200.
USPTO; Office Action dated Mar. 31, 2009 in U.S. Appl. No. 12/120,190.
USPTO; Final Office Action dated Dec. 4, 2009 in U.S. Appl. No. 12/120,190.
USPTO; Office Action dated Jun. 28, 2010 in U.S. Appl. No. 12/120,190.
USPTO; Final Office Action dated Jan. 6, 2011 in U.S. Appl. No. 12/120,190.
USPTO; Office Action dated Jun. 27, 2011 in U.S. Appl. No. 12/120,190.
USPTO; Office Action dated Apr. 13, 2009 in U.S. Appl. No. 12/264,416.
USPTO; Final Office Action dated Oct. 8, 2009 in U.S. Appl. No. 12/264,416.
USPTO; Office Action dated Feb. 1, 2010 in U.S. Appl. No. 12/264,416.
USPTO; Final Office Action dated Jun. 30, 2010 in U.S. Appl. No. 12/264,416.
USPTO; Office Action dated Mar. 17, 2011 in U.S. Appl. No. 12/264,416.
USPTO; Final Office Action dated Jul. 7, 2011 in U.S. Appl. No. 12/264,416.
USPTO; Office Action dated Apr. 27, 2009 in U.S. Appl. No. 12/146,788.
USPTO; Final Office Action dated Oct. 15, 2009 in U.S. Appl. No. 12/146,788.
USPTO; Office Action dated Feb. 16, 2010 in U.S. Appl. No. 12/146,788.
USPTO; Final Office Action dated Jul. 13, 2010 in U.S. Appl. No. 12/146,788.
USPTO; Office Action dated Apr. 19, 2011 in U.S. Appl. No. 12/146,788.
USPTO; Notice of Allowance dated Aug. 19, 2011 in U.S. Appl. No. 12/146,788.
USPTO; Office Action dated May 22, 2009 in U.S. Appl. No. 12/369,362.
USPTO; Final Office Action dated Dec. 14, 2009 in U.S. Appl. No. 12/369,362.
USPTO; Office Action dated Jun. 16, 2009 in U.S. Appl. No. 12/146,770.
USPTO; Final Office Action dated Feb. 24, 2010 in U.S. Appl. No. 12/146,770.
USPTO; Office Action dated Jun. 9, 2010 in U.S. Appl. No. 12/146,770.
USPTO; Office Action dated Nov. 18, 2010 in U.S. Appl. No. 12/146,770.
USPTO; Final Office Action dated Apr. 4, 2011 in U.S. Appl. No. 12/146,770.
USPTO; Notice of Allowance dated Aug. 22, 2011 in U.S. Appl. No. 12/146,770.
USPTO; Office Action dated Dec. 11, 2009 in U.S. Appl. No. 11/766,617.
USPTO; Office Action dated Mar. 8, 2010 in U.S. Appl. No. 11/766,617.
USPTO; Final Office Action dated Sep. 20, 2010 in U.S. Appl. No. 11/766,617.
USPTO; Office Action dated Mar. 1, 2011 in U.S. Appl. No. 11/766,617.
USPTO; Office Action dated Sep. 22, 2011 in U.S. Appl. No. 11/766,617.
USPTO; Final Office Action dated Jun. 11, 2010 in U.S. Appl. No. 12/395,430.
USPTO; Office Action dated Nov. 24, 2010 in U.S. Appl. No. 12/395,430.
USPTO; Final Office Action dated Apr. 6, 2011 in U.S. Appl. No. 12/395,430.
USPTO; Office Action dated Aug. 18, 2011 in U.S. Appl. No. 12/395,430.
USPTO; Office Action dated Sep. 29, 2010 in U.S. Appl. No. 12/758,509.
USPTO; Final Office Action dated May 11, 2011 in U.S. Appl. No. 12/758,509.
USPTO; Office Action dated Sep. 22, 2011 in U.S. Appl. No. 12/880,027.
USPTO; Office Action dated Aug. 25, 2011 in U.S. Appl. No. 13/047,747.
USPTO; Office Action dated Aug. 25, 2011 in U.S. Appl. No. 13/047,719.
USPTO; Office Action dated Aug. 27, 2001 in U.S. Appl. No. 90/005,910.
CIPO; Office Action dated Dec. 04, 2001 in Application No. 2,115,929.
CIPO; Office Action dated Apr. 22, 2002 in Application No. 2,115,929.
CIPO; Notice of Allowance dated Jul. 18, 2003 in Application No. 2,115,929.
CIPO; Office Action dated Jun. 30, 2003 in Application No. 2,176,475.
CIPO; Notice of Allowance dated Sep. 15, 2004 in Application No. 2,176,475.
CIPO; Office Action dated May 29, 2000 in Application No. 2,242,174.
CIPO; Office Action dated Feb. 22, 2006 in Application No. 2,244,251.
CIPO; Office Action dated Mar. 27, 2007 in Application No. 2,244,251.
CIPO; Office Action dated Sep. 18, 2002 in Application No. 2,305,865.
CIPO; Notice of Allowance dated May 2, 2003 in Application No. 2,305,865.
EPO; Examination Report dated Oct. 6, 2008 in Application No. 08158682.
EPO; Office Action dated Jan. 26, 2010 in Application No. 08158682.
EPO; Office Action dated Feb. 15, 2011 in Application No. 08158682.
EPO; Search Report dated Nov. 9, 1998 in Application No. 98112356.
EPO; Office Action dated Feb. 6, 2003 in Application No. 99941032.
EPO; Office Action dated Aug. 20, 2004 in Application No. 99941032.
PCT; International Search Report or Declaration dated Nov. 15, 1999 in Application No. PCT/US1999/18178.
PCT; International Search Report or Declaration dated Oct. 9, 1998 in Application No. PCT/US1999/22440.

"Response to Final Office Action and Request for Continued Examination for U.S. Appl. No. 09/275,627," Including Declarations of Haynes and Johnson, Apr. 16, 2001.

Document No. 504217: Excerpts from "Pyrotek Inc.'s Motion for Summary Judgment of Invalidity and Unenforceability of U.S. Patent No. 7,402,276," Oct. 2, 2009.

Document No. 505026: Excerpts from "MMEI's Response to Pyrotek's Motion for Summary Judgment of Invalidity or Enforceability of U.S. Patent No. 7,402,276," Oct. 9, 2009.

Document No. 507689: Excerpts from "MMEI's Pre-Hearing Brief and Supplemental Motion for Summary Judgment of Infringement of Claims 3-4, 15, 17-20, 26 and 28-29 of the '074 Patent and Motion for Reconsideration of the Validity of Claims 7-9 of the '276 Patent," Nov. 4, 2009.

Document No. 517158: Excerpts from "Reasoned Award," Feb. 19, 2010.

Document No. 525055: Excerpts from "Molten Metal Equipment Innovations, Inc.'s Reply Brief in Support of Application to Confirm Arbitration Award and Opposition to Motion to Vacate," May 12, 2010.

USPTO; Final Office Action dated Dec. 13, 2011 in U.S. Appl. No. 12/395,430.

USPTO; Office Action dated Jan. 27, 2012 in U.S. Appl. No. 11/766,617.

USPTO; Notice of Allowance dated May 15, 2012 in U.S. Appl. No. 11/766,617.

USPTO; Supplemental Notice of Allowance dated Jul. 31, 2012 in U.S. Appl. No. 11/766,617.

USPTO; Notice of Allowance dated Aug. 24, 2012 in U.S. Appl. No. 11/766,617.

USPTO; Notice of Allowance dated Feb. 6, 2012 in U.S. Appl. No. 12/120,190.

USPTO; Final Office Action dated Feb. 3, 2012 in U.S. Appl. No. 12/120,200.

USPTO; Final Office Action dated Jun. 8, 2012 in U.S. Appl. No. 12/264,416.

USPTO; Advisory Action dated Feb. 22, 2012 in U.S. Appl. No. 12/395,430.

USPTO; Office Action dated Feb. 27, 2012 in U.S. Appl. No. 12/853,253.

USPTO; Ex Parte Quayle Action dated Jun. 27, 2012 in U.S. Appl. No. 12/853,253.

USPTO; Office Action dated Mar. 12, 2012 in U.S. Appl. No. 12/853,255.

USPTO; Final Office Action dated Jul. 24, 2012 in U.S. Appl. No. 12/853,255.

USPTO; Office Action dated Apr. 19, 2012 in U.S. Appl. No. 12/853,268.

USPTO; Final Office Action dated Sep. 17, 2012 in U.S. Appl. No. 12/853,268.

USPTO; Office Action dated May 29, 2012 in U.S. Appl. No. 12/878,984.

USPTO; Final Office Action dated Feb. 16, 2012 in U.S. Appl. No. 12/880,027.

USPTO; Office Action dated Sep. 11, 2012 in U.S. Appl. No. 13/047,719.

USPTO; Final Office Action dated Feb. 7, 2012 in U.S. Appl. No. 13/047,747.

USPTO; Notice of Allowance dated Apr. 18, 2012 in U.S. Appl. No. 13/047,747.

USPTO; Office Action dated Apr. 18, 2012 in U.S. Appl. No. 13/252,145.

USPTO; Final Office Action dated Sep. 17, 2012 in U.S. Appl. No. 13/252,145.

CIPO; Notice of Allowance dated Jan. 15, 2008 in Application No. 2,244,251.

USPTO; Notice of Allowance dated Sep. 20, 2012 in U.S. Appl. No. 12/395,430.

USPTO; Notice of Allowance dated Oct. 2, 2012 in U.S. Appl. No. 12/853,253.

USPTO; Office Action dated Oct. 3, 2012 in U.S. Appl. No. 12/878,984.

USPTO; Notice of Allowance dated Nov. 21, 2012 in U.S. Appl. No. 12/853,268.

USPTO; Office Action dated Nov. 28, 2012 in U.S. Appl. No. 12/264,416.

USPTO; Notice of Allowance dated Nov. 30, 2012 in U.S. Appl. No. 13/252,145.

US 5,961,265, 10/1999, Kato (withdrawn)

\* cited by examiner

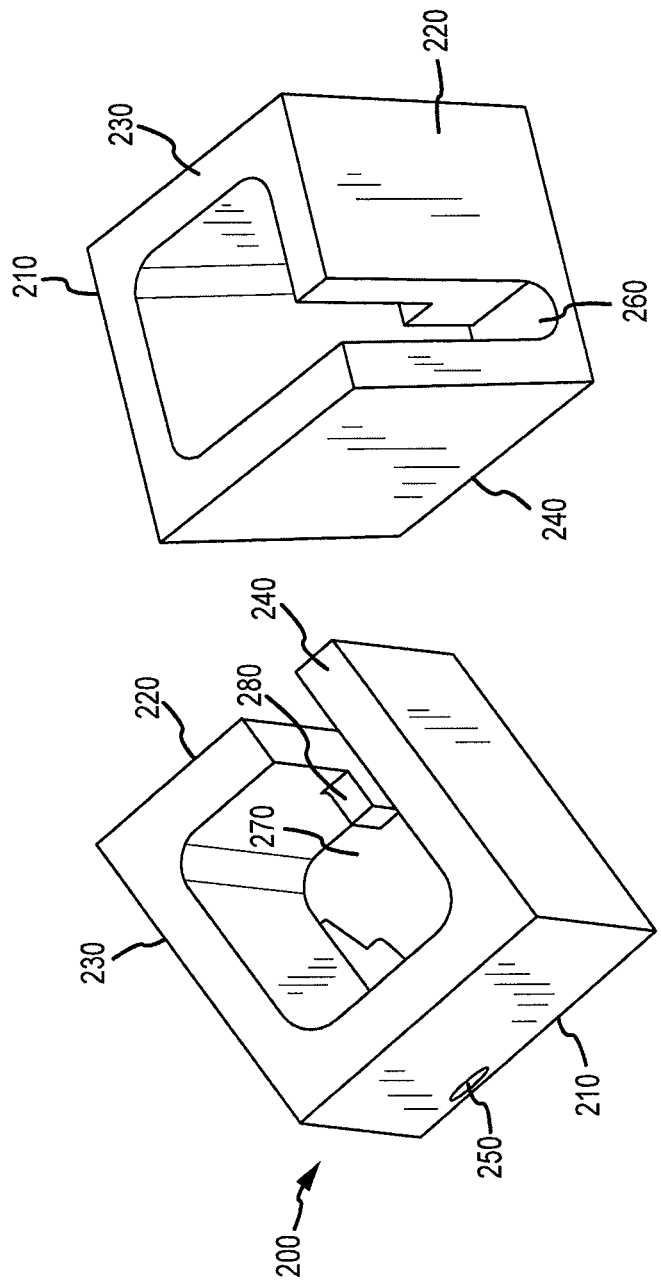

SYSTEMS AND METHODS FOR MELTING SCRAP METAL

DESCRIPTION OF THE INVENTION

This application claims priority to and incorporates by reference the disclosures of: U.S. Provisional Application No. 61/232,392 filed Aug. 7, 2009.

FIELD OF THE INVENTION

The invention relates to systems and methods for melting scrap metal. More particularly, the invention relates to systems and methods for melting scrap metal using a vessel comprising a directional flow member.

BACKGROUND OF THE INVENTION

As used herein, the term "molten metal" means any metal or combination of metals in liquid form, such as aluminum, copper, iron, zinc, and alloys thereof. The term "gas" means any gas or combination of gases, including argon, nitrogen, chlorine, fluorine, Freon, and helium, which may be released into molten metal.

A reverbatory furnace is used to melt metal and retain the molten metal while the metal is in a molten state. The molten metal in the furnace is sometimes called the molten metal bath. Reverbatory furnaces usually include a chamber for retaining a molten metal pump and that chamber is sometimes referred to as the pump well.

Known pumps for pumping molten metal (also called "molten-metal pumps") include a pump base (also called a "base", "housing" or "casing") and a pump chamber (or "chamber" or "molten metal pump chamber"), which is an open area formed within the pump base. Such pumps also include one or more inlets in the pump base, an inlet being an opening to allow molten metal to enter the pump chamber.

A discharge is formed in the pump base and is a channel or conduit that communicates with the molten metal pump chamber, and leads from the pump chamber to the molten metal bath. A tangential discharge is a discharge formed at a tangent to the pump chamber. The discharge may also be axial, in which case the pump is called an axial pump. In an axial pump the pump chamber and discharge may be the essentially the same structure (or different areas of the same structure) since the molten metal entering the chamber is expelled directly through (usually directly above or below) the chamber.

A rotor, also called an impeller, is mounted in the pump chamber and is connected to a drive shaft. The drive shaft is typically a motor shaft coupled to a rotor shaft, wherein the motor shaft has two ends, one end being connected to a motor and the other end being coupled to the rotor shaft. The rotor shaft also has two ends, wherein one end is coupled to the motor shaft and the other end is connected to the rotor. Often, the rotor shaft is comprised of graphite, the motor shaft is comprised of steel, and the two are coupled by a coupling, which is usually comprised of steel.

As the motor turns the drive shaft, the drive shaft turns the rotor and the rotor pushes molten metal in a desired direction. Most molten metal pumps are gravity fed, wherein gravity forces molten metal through the inlet and into the pump chamber as the rotor pushes molten metal out of the pump chamber.

Molten metal pump casings and rotors usually, but not necessarily, employ a bearing system comprising ceramic rings wherein there are one or more rings on the rotor that align with rings in the pump chamber such as rings at the inlet (which is usually the opening in the housing at the top of the pump chamber and/or bottom of the pump chamber) when the rotor is placed in the pump chamber. The purpose of the bearing system is to reduce damage to the soft, graphite components, particularly the rotor and pump chamber wall, during pump operation. A known bearing system is described in U.S. Pat. No. 5,203,681 to Cooper, the disclosure of which is incorporated herein by reference. U.S. Pat. Nos. 5,951,243 and 6,093,000, each to Cooper, the disclosures of which are incorporated herein by reference, disclose, respectively, bearings that may be used with molten metal pumps and rigid coupling designs and a monolithic rotor. U.S. Pat. No. 2,948,524 to Sweeney et al., U.S. Pat. No. 4,169,584 to Mangalick, and U.S. Pat. No. 6,123,523 to Cooper (the disclosure of the afore-mentioned patent to Cooper is incorporated herein by reference) also disclose molten metal pump designs. U.S. Pat. No. 6,303,074 to Cooper discloses dual-flow rotors and is incorporated herein by reference.

Furthermore, U.S. Pat. No. 7,402,276 to Cooper entitled "Pump With Rotating Inlet" (also incorporated by reference) discloses, among other things, a pump having an inlet and rotor structure (or other displacement structure) that rotate together as the pump operates in order to alleviate jamming.

The materials forming the molten metal pump components that contact the molten metal bath should remain relatively stable in the bath. Structural refractory materials, such as graphite or ceramics, that are resistant to disintegration by corrosive attack from the molten metal may be used. As used herein "ceramics" or "ceramic" refers to any oxidized metal (including silicon) or carbon-based material, excluding graphite, capable of being used in the environment of a molten metal bath. "Graphite" means any type of graphite, whether or not chemically treated. Graphite is particularly suitable for being formed into pump components because it is (a) soft and relatively easy to machine, (b) not as brittle as ceramics and less prone to breakage, and (c) less expensive than ceramics.

Three basic types of pumps for pumping molten metal, such as molten aluminum, are utilized: circulation pumps, transfer pumps and gas-release pumps. Generally circulation pumps are used to circulate the molten metal within a bath, thereby generally equalizing the temperature of the molten metal. Most often, circulation pumps are used in a reverbatory furnace having an external well. The well is usually an extension of a charging well where scrap metal is charged (i.e., added).

Transfer pumps are generally used to transfer molten metal from a vessel, such as the external well of a reverbatory furnace, to a different location such as a launder, ladle, or another furnace. Examples of transfer pumps are disclosed in U.S. Pat. No. 6,345,964 B1 to Cooper, the disclosure of which is incorporated herein by reference, and U.S. Pat. No. 5,203,681.

Gas-release pumps, such as gas-injection pumps, circulate molten metal while releasing a gas into the molten metal. In the purification of molten metals, particularly aluminum, it is frequently desired to remove dissolved gases such as hydrogen, or dissolved metals, such as magnesium, from the molten metal. As is known by those skilled in the art, the removing of dissolved gas is known as "degassing" while the removal of magnesium is known as "demagging". Gas-release pumps may be used for either of these purposes or for any other application for which it is desirable to introduce gas into molten metal. Gas-release pumps generally include a gas-transfer conduit having a first end that is connected to a gas source and a second submerged in the molten metal bath. Gas is introduced into the first end of the gas-transfer conduit and is released from the second end into the molten metal. The gas may be released downstream of the pump chamber into either the pump discharge or a metal-transfer conduit extending from the discharge, or into a stream of molten metal exiting either the discharge or the metal-transfer conduit. Alternatively, gas may be released into the pump chamber or upstream of the pump chamber at a position where it enters the pump chamber. A system for releasing gas into a pump chamber is disclosed in U.S. Pat. No. 6,123,523 to Cooper. Furthermore, gas may be released into a stream of molten metal passing through a discharge or metal-transfer conduit wherein the position of a gas-release opening in the metal-transfer conduit enables pressure from the molten metal stream to assist in drawing gas into the molten metal stream. Such a structure and method is disclosed in U.S. application Ser. No. 12/120,190 entitled "System for Releasing Gas into Molten Metal", invented by Paul V. Cooper, and filed on Feb. 4, 2004, the disclosure of which is incorporated herein by reference.

Referring now to FIG. 1, conventional scrap melter systems generally include a circulation pump 90 and a scrap melter 92. A vessel 21 containing a molten metal bath 2 is generally divided into three compartments. A first compartment 1 (called a pump well) typically houses the circulation pump 90. A second compartment 3 (called a charge well) typically houses the scrap melter 92. A third compartment 7 (called a skim well) allows dross and oxide from the melting process to be skimmed off the molten metal 2. The circulating molten metal 2 moves between compartment 1, compartment 3, and compartment 7 and is preferably circulated throughout the vessel 21. Scrap S is introduced into compartment 3 and is submerged by the downward draw traditionally created by an impeller 94 of the scrap melter 92, which draws the scrap downward into the molten metal bath 21. The molten metal bath 21 is generally maintained, at least partially, in a remelting furnace having a heating chamber interconnected to a melting chamber. The bath 21 is maintained at a temperature at or above the melting point of the scrap metal S in order to melt the scrap metal S.

Conventional scrap melting systems involve moving parts, so breakage and maintenance can be a problem. Also, when excess air is pulled from the surface as with a vortex of molten metal, dross (in the form of metal oxides) is formed. Dross can plug ports, cause breakage of pump parts and is difficult to remove. The present invention addresses these and other issues.

BRIEF SUMMARY OF THE INVENTION

Embodiments of the present invention draw scrap metal down into a molten metal bath and assist in the melting of scrap metal without the use of a conventional scrap melter.

In accordance with the invention, a scrap submergence vessel (or "vessel") for drawing scrap metal downward into a molten metal bath is disclosed. The vessel includes a front wall having an inlet, a back wall (opposite the front wall) having an outlet, and a flow direction member that causes molten metal flowing into the inlet to be directed at least partially upward against an upper portion of the back wall and towards the surface of the molten metal bath. The back wall directs the molten metal back towards the front wall, which directs it towards the outlet. A molten metal pump would typically be used to push or direct a stream of molten metal into the vessel.

This movement of molten metal through the scrap submergence vessel creates a downward draw and pulls metal scrap placed on the surface of the molten metal bath within the top of the vessel downward beneath the surface to melt it. The present invention has no moving parts and is unlikely to generate a vortex.

Both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate at least one embodiment of the invention and together with the description, serve to explain the principles of the invention.

FIGS. 2A-2D illustrate a scrap submergence vessel according to various aspects of the present invention.

Figure 1:
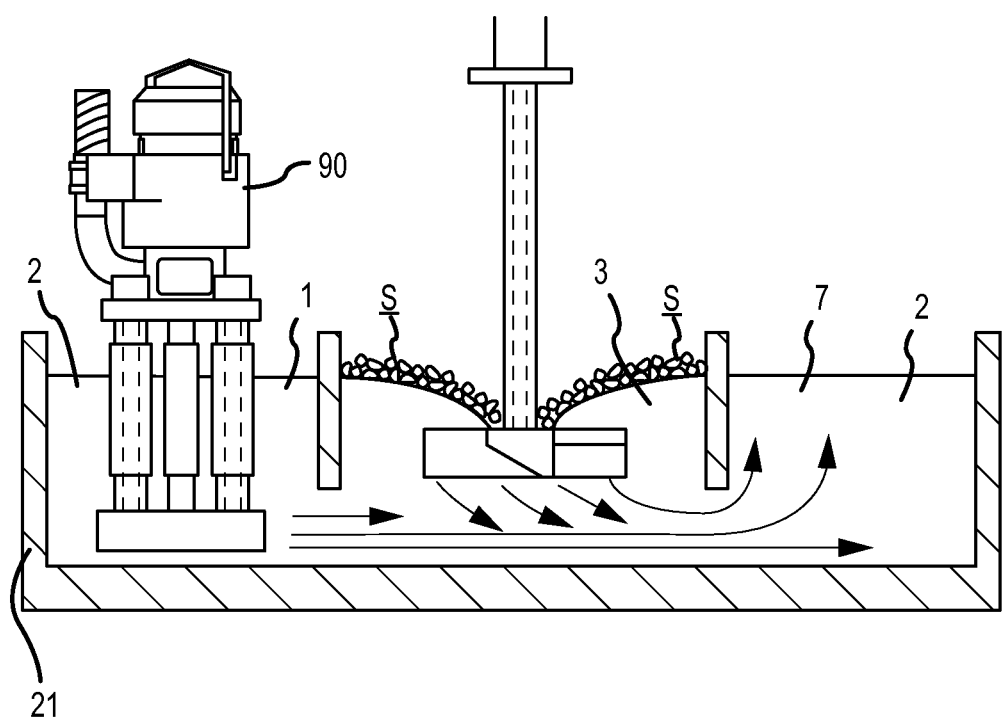
FIG. 1 illustrates a conventional scrap melter system.

Elements in the figures are illustrated for simplicity and clarity and have not necessarily been drawn to scale.

DETAILED DESCRIPTION OF PREFERRED EMBODIMENTS

Referring now to the drawings where the purpose is to describe a preferred embodiment of the invention and not limit same, a vessel 200 is shown that alters a flow of molten metal, which is typically generated from a molten metal pump, in order to create a downward draw to submerge scrap metal.

Vessel 200

FIGS. 2A through 2F depict a scrap submergence vessel 200 for melting scrap metal according to various aspects of the present invention. The vessel 200 may be any size, shape, and configuration suitable for generating a downward draw sufficient to submerge scrap. In one exemplary embodiment, the vessel 200 is approximately 4' wide, 4.5' long, and 3.5' tall. The vessel 200 includes a front wall 210, a back wall 220, a left sidewall 230, and a right sidewall 240. The vessel 200 also includes an inlet 250 in the front wall 210, and an outlet 260 in the back wall 220. The inlet 250 and outlet 260 are in fluid communication with each other. The vessel 200 further includes a flow direction member 270 and a partition 280 to aid in directing the flow of molten metal pumped into the vessel 200 through the inlet 250.

The walls (210, 220, 230, and 240) of the vessel 200 may interface with each other in any suitable manner to create a sufficient downward draw. In the exemplary embodiment depicted in FIGS. 2A-2F, the interior intersections between the walls are rounded, while the exterior intersections are angular. Among other things, the rounded interfaces between the walls (210, 220, 230, and 240) help the directional flow member 270 direct the flow of molten metal within the vessel 200. The angular exterior intersections of the vessel 200 allow the vessel to interface tightly with other systems and structures, such as between the pump well 410 and skim well 430 in the exemplary system depicted in FIGS. 4A and 4B.

Additionally, the walls (210, 220, 230, and 240) of the vessel 200 may be configured and oriented in any suitable manner. In the exemplary embodiment depicted in FIGS.

2A-2F, the walls (210, 220, 230, and 240) of the vessel 200 are substantially vertical, and the faces of opposing walls (e.g., 210 and 220) in this exemplary embodiment are substantially parallel to each other. However, any wall of the vessel faces may, in alternate embodiments, be suitably sloped, shaped, or angled to assist in the flow of molten metal from the inlet 250 to the outlet 260. In vessel 200, for example, as described above, the intersections between the walls in the interior of the vessel 200 are rounded to help direct the flow of molten metal within the vessel 200.

The components of the present invention that are exposed to molten metal, including the walls (210, 220, 230, and 240) of vessel 200, are preferably formed of structural refractory materials, which are resistant to degradation in molten metal, such as graphite or ceramic. The components of the vessel 200 may include any desired combinations of different materials, and may be any size, shape, and configuration.

The vessel 200 includes an open top to allow scrap metal to be placed into the vessel 200 to be melted. In one embodiment of the present invention, the vessel 200 may include a top covering or lid (not shown). A lid operating in conjunction with the present invention may cover a portion of the vessel 200 or it can cover the entire vessel 200, as well as any structures or devices surrounding and/or attached to the vessel 200. The lid can be made from structural refractory materials and/or the same materials as the vessel 200. The lid may be permanently affixed to a portion of the vessel 200 (e.g., and opened and closed via hinges) or it may be removably coupled to the vessel 200 in any suitable manner. Among other things, the lid can allow the vessel 200 to be purged with gas for various reasons.

Inlet 250

The inlet 250 may include any suitable structure (such as an opening or channel) that allows molten metal to be pumped into the vessel 200. The inlet 250 can be any suitable size, shape, and configuration to allow molten metal to enter the vessel 200. In the present exemplary embodiment, the inlet 250 is ovoid and has a width of about 8 inches and a height of about 6 inches. Preferably, the inlet 250 is offset from (i.e., not directly in-line with) the outlet 260. This allows the flow direction member 270 to direct the flow of the molten metal, and helps prevent molten metal from flowing directly from the inlet 250 to the outlet 260 without circulating within the vessel 200 and creating a downward draw to submerge scrap. The inlet 250 and outlet 260 can be offset from each other in any desired manner. In the present exemplary embodiment, the inlet 250 is located closer to the left sidewall 230 than the right sidewall 240, whereas the outlet 260 is located closer to the right sidewall 240 than the left sidewall 230. The inlet 250 in the present exemplary embodiment is sized and configured to interface with the metal discharge of a molten metal circulation pump, such as pump 415 depicted in FIGS. 4A and 4B, and described in more detail below.

Outlet 260

The outlet 260 allows molten metal to exit the vessel 200. The outlet 260 may be any suitable size, shape and configuration. In the present embodiment, for example, outlet 260 comprises a channel approximately 10 inches wide and running substantially the height of the back wall 220. As best seen in FIG. 2B, the outlet channel 260 has two substantially parallel walls with a curved base and open top. As discussed previously, the inlet 250 is preferably offset from (i.e., not directly inline with) the outlet channel 30. The outlet 260 may interface with any other suitable device, structure, or system. For example, in one embodiment of a system operating in conjunction with the vessel 200 (depicted in FIGS. 4A and 4B, and described in more detail below) the outlet 260 allows molten metal to flow from the vessel 200 into a skim well 430 to allow dross and oxidation to be skimmed from the molten metal.

Flow Direction Member 270

Figure 2C:
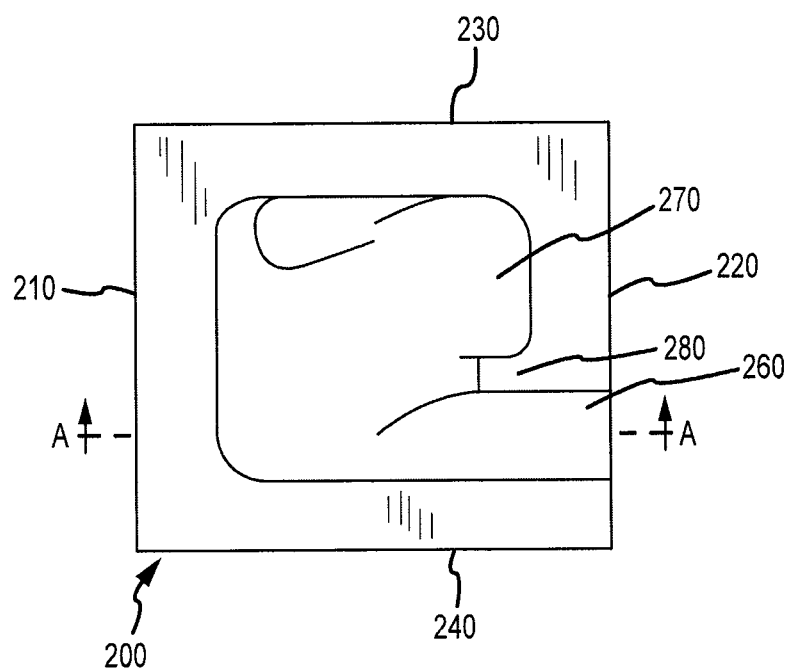
Figure 2D:
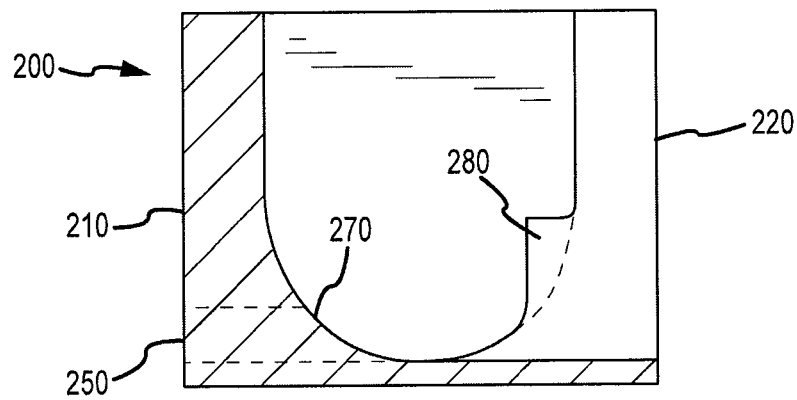
Figure 2E:
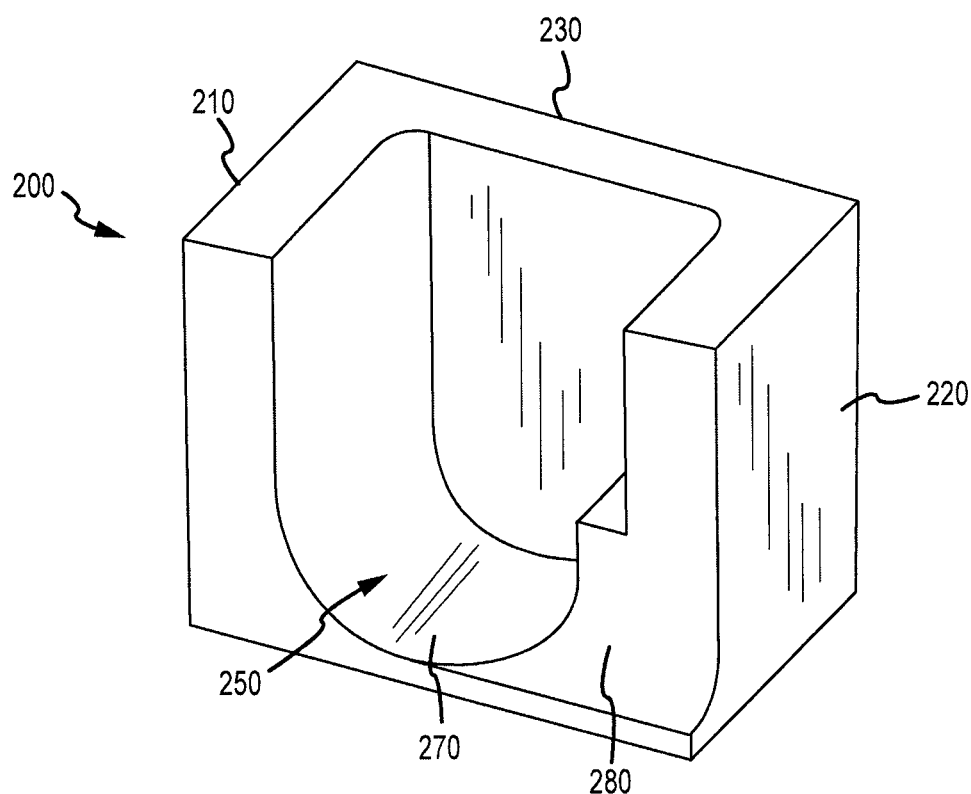
FIGS. 2E and 2F are partial, perspective views of the scrap submergence vessel of FIGS. 2A-2D.

The vessel 200 includes a flow direction member 270 for directing the flow of molten metal received through the inlet 250. As best seen in FIGS. 2A and 2C, the flow direction member 270 comprises a curved surface formed along the bottom of the vessel 200 that transitions from a lower portion near the inlet 250 to a higher portion near the back wall 220. The configuration of the flow direction member 270, among other things, causes molten metal provided to the inlet 250 to be directed at least partially upward against a portion of the back wall 220. The flow direction member 270 in the present exemplary embodiment also at least partially directs molten metal towards sidewall 230 and the intersection between the sidewall 230 and the back wall 220, which is rounded in this embodiment. As molten metal is directed against the back wall 220, sidewall 230, and and/or the intersection between the two, it is at least partially redirected towards the front wall 210, as well as the sidewall 240 and the intersection between the front wall 210 and sidewall 240 (also rounded in this embodiment). The molten metal is then directed towards outlet 260. According to the present invention, the flow direction member 270 may include any alternate size, shape, and configuration that directs the flow of molten metal to create turbulence within the vessel that helps pull metal scrap beneath the surface of the molten metal.

The movement of molten metal through the vessel 200 described herein induces a downward draw that pulls metal scrap placed at the top surface within or above the vessel 200 beneath the surface of the molten metal.

In the exemplary vessels 200 and 300, depicted in FIGS. 2A-2F and 3A-3D, respectively, the inlet 250 and outlet 260 are offset (i.e., not directly in line with each other) and are formed in opposing walls (210, 220). In alternate embodiments, however, depending on the shape and configuration of the flow direction member 270, the inlet 250 and outlet 260 could be formed in adjacent walls, or even the same wall. Preferably, the inlet 250 and 260 are positioned such that the flow direction member 270 is able to circulate the molten metal between the inlet 250 and the outlet 260 and against the walls of the vessel 200 to induce turbulence that breaks the surface tension of the molten metal and pulls metal scraps placed within the vessel 200 beneath the surface of the molten metal.

The flow direction member 270 may include, or operate in conjunction with, any desired structures (such as partition 280 discussed below) to direct the flow of molten metal 200 through the vessel. Portions of the flow direction member 270 may be concave, convex, angular, or have any other desired shape and configuration. The flow direction member 270 may include any number and type of structure(s), such as a groove, a notch, a channel, an opening, a trough, a wedge, a conduit, a chute, a platform, and/or a wall. Portions of the flow direction member 270 may include, extend from, or extend into, any desired portion of the vessel 200, such as one or more of the walls 210, 220, 230, 240.

Unlike many conventional systems, the present invention is unlikely to generate splashing or a swirling vortex of molten metal which can create dross as well as unwanted air pockets in metal ingots and finished parts. Furthermore, the present invention does not require the use of a scrap melter (such as scrap melter 92 shown in FIG. 1) having a motor or impeller.

Partition 280

Figure 2F:
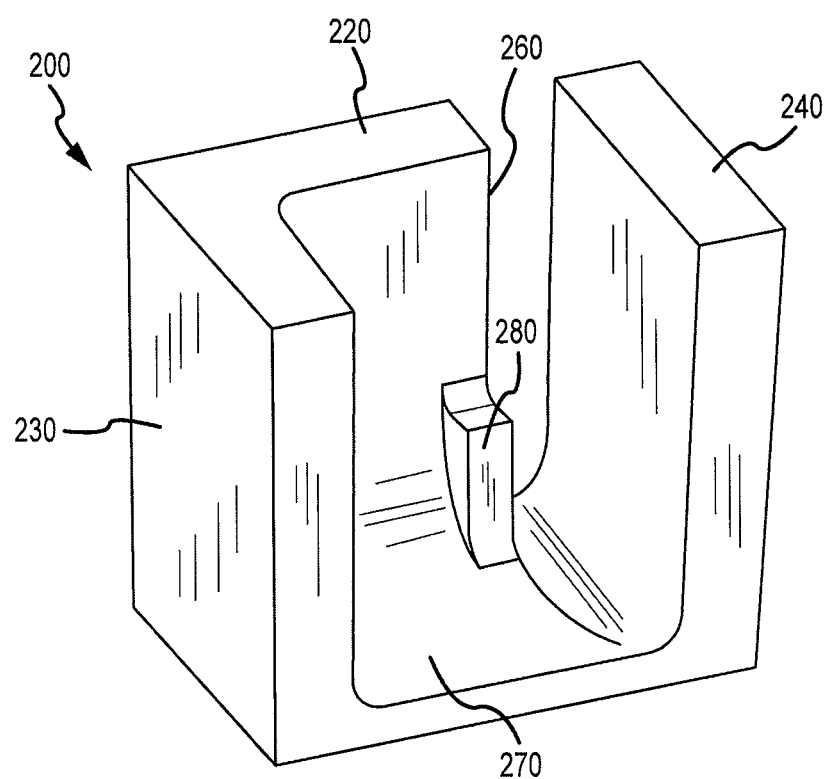
Figure 3B:
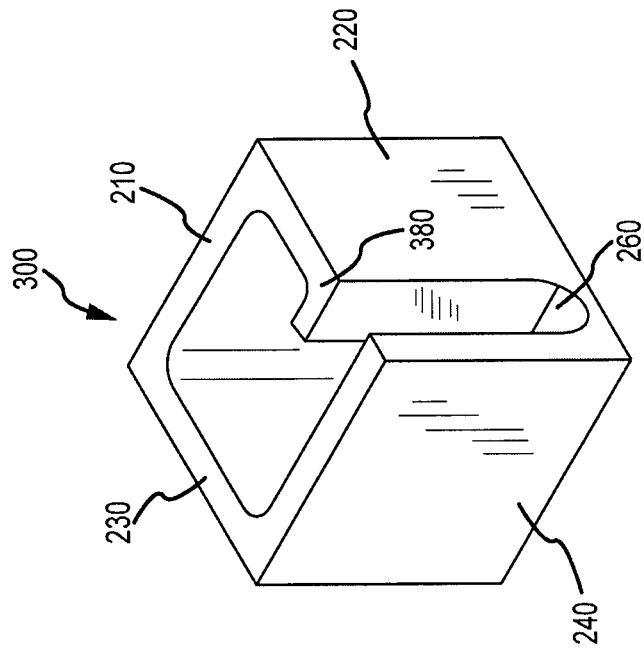
FIGS. 3A-3D illustrate another scrap submergence vessel according to various aspects of the present invention.
Figure 3A:
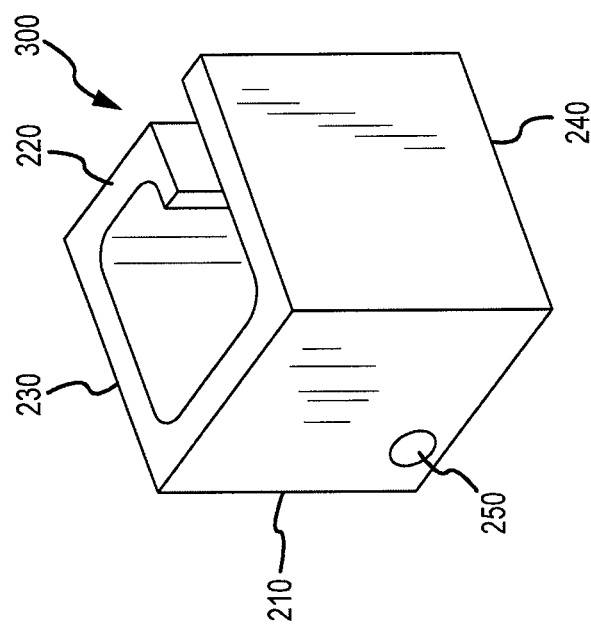
Figure 3C:
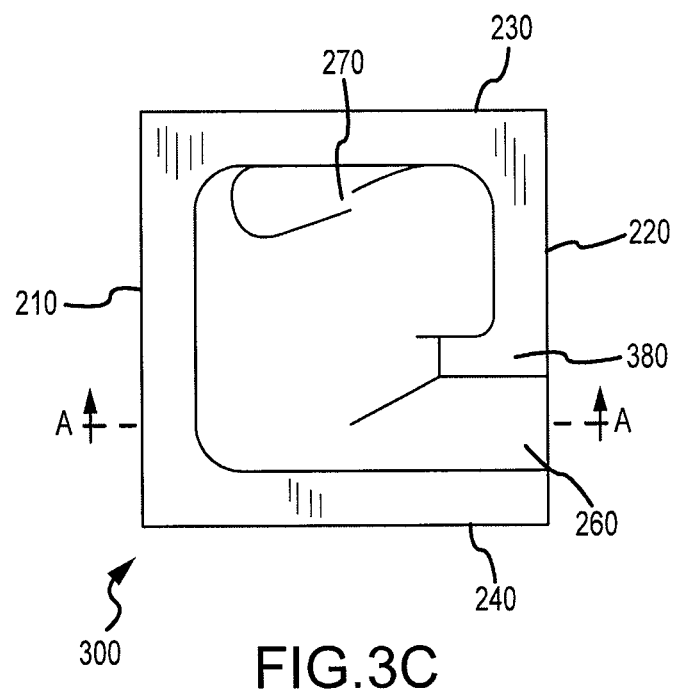
Figure 3D:
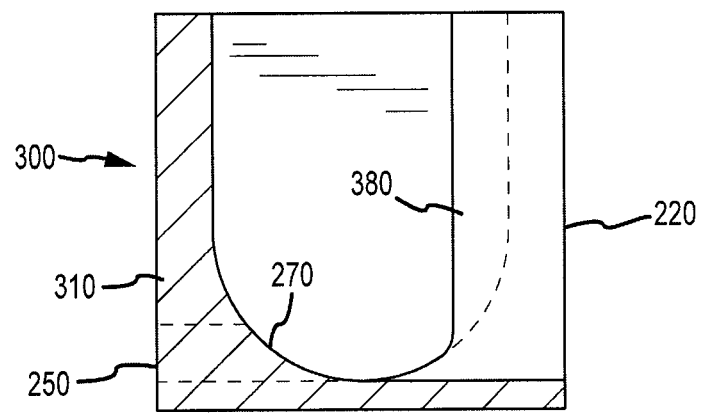

As best seen in FIGS. 2A and 2F, the vessel 200 includes a partition 280 to help direct the flow of molten metal. In this exemplary embodiment, the partition 280 extends alongside the outlet channel 260 from the bottom surface of the vessel 200. Partition 280 may be any suitable dimension for directing the flow of molten metal. In the present embodiment, for example, the partition 280 extends approximately 16 inches from the bottom of the vessel 200 and extends approximately 6 inches from the back wall 220 of the vessel 200.

In another exemplary embodiment, referring now to FIGS. 3A through 3D, vessel 300 includes a partition 380 that extends from the bottom surface of the vessel 200 to the top of the vessel 200. In all other respects, the components of vessel 300 are the same, and function in the same manner, as the previously-described components described above for vessel 200. Among other things, partitions 280, 380 help direct the flow of molten metal from the inlet 250 towards the back wall 220, and prevent molten metal from flowing directly from the inlet 250 to the outlet 260 without circulating within the vessel 200.

System 400

Figure 4A:
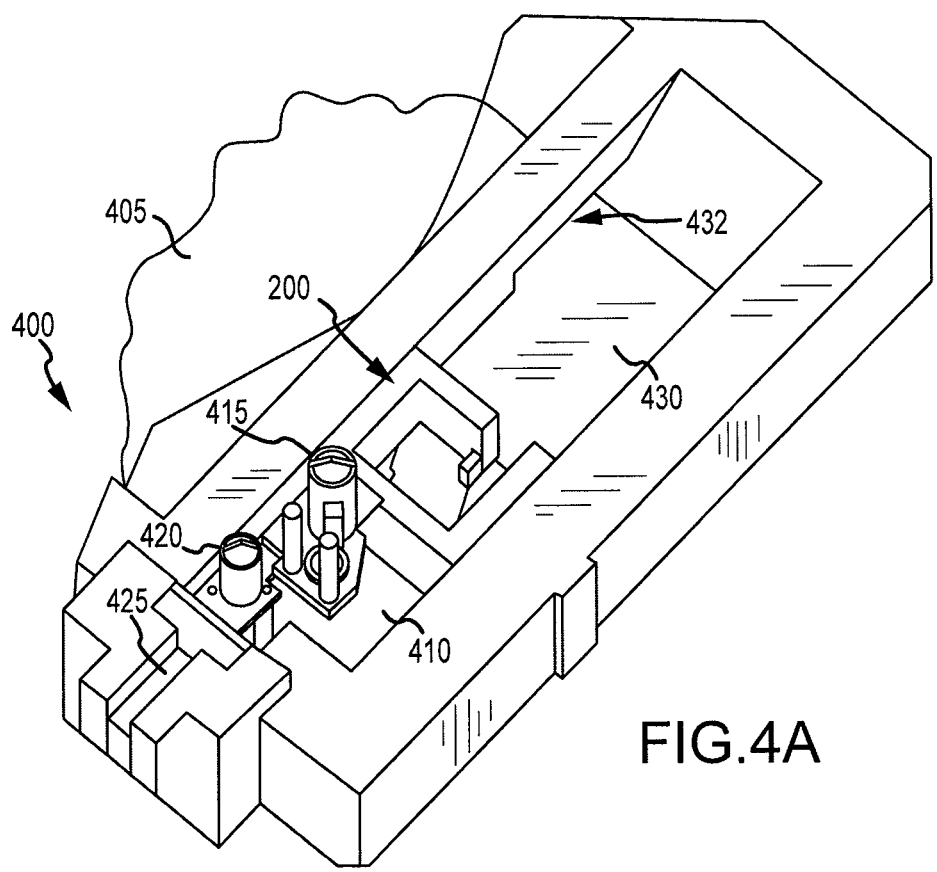
FIGS. 4A and 4B illustrate an exemplary system employing a scrap submergence vessel of the present invention.
Figure 4B:
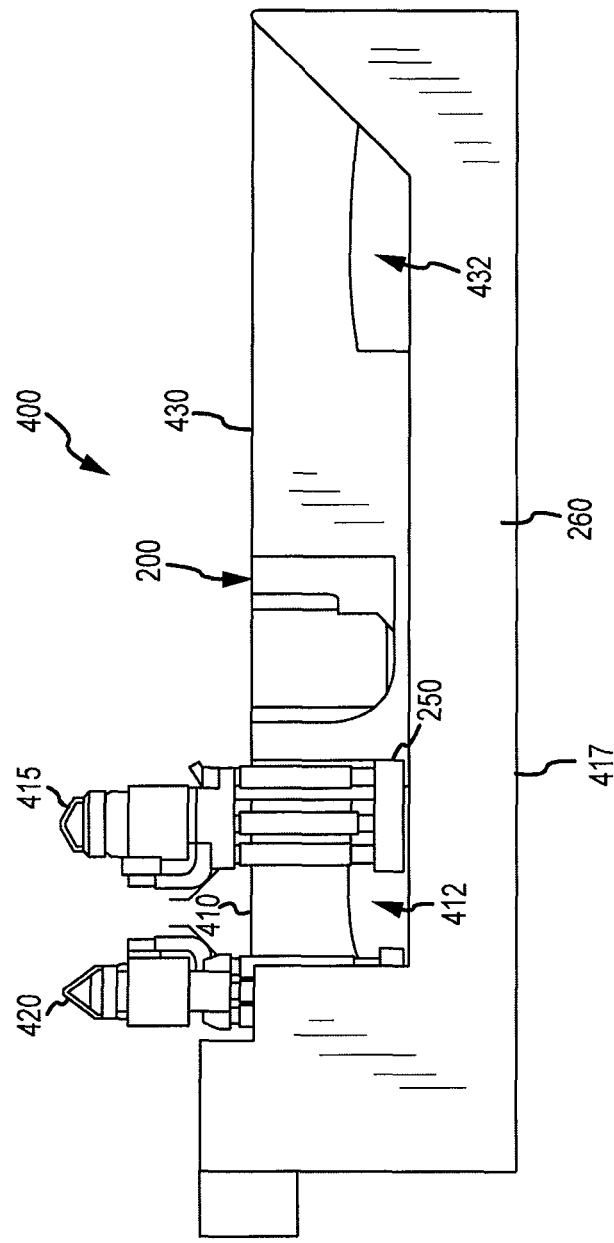

An exemplary system employing an exemplary scrap submergence vessel 200 is depicted in FIGS. 4A and 4B. In this exemplary system, the scrap submergence vessel 200 acts as a charge well into which scrap metal can be placed to be melted. The system includes a pump well 410 in which a circulation pump 415 and a launder transfer pump 420 are positioned. The pump well 410 includes an archway 410 in communication with a molten metal bath 405. The inlet 250 of the vessel 200 is coupled to a tangential discharge 417 of the circulation pump 415. The circulation pump 415 is configured to pump molten metal entering the pump well 410 from the bath 405 through the inlet 250 and into the vessel 200, while the launder transfer pump 420 is configured to pump the molten metal into the launder 425. The outlet 260 of the vessel 200 opens into a skim well 430. In alternate embodiments of systems in accordance with the present invention, multiple vessels/charge wells could operate simultaneously in parallel or series.

Pump 415

The preferred circulation pump 415 is configured to pump molten metal through the inlet 250 and into the vessel 200. The present invention may operate in conjunction with any device for pumping or otherwise conveying molten metal, such as one of the pumps disclosed in U.S. Pat. No. 5,203,681 to Cooper, which is incorporated by reference herein. The preferred circulation pump 415 includes a tangential discharge 417, which is coupled to the inlet 250. The discharge 417 in the exemplary system of FIGS. 4A and 4B is coupled to the inlet 250 using a metal bracket, though the discharge 417 can be secured to the inlet 250 using any other desired fastener(s). Preferably, the pump 415 is placed in the pump well 410 such that it can pump molten metal from the bath 405 into the vessel 200 through inlet 250. However, the circulation pump 415 need not be joined directly to the inlet 250 during operation. In alternate embodiments, the pump 415 may be connected to the inlet 250 of the vessel 200 by a metal-transfer conduit. Alternatively, a gas-release pump may be used instead of a circulation pump.

Skim Well 430

The outlet 260 of the vessel 200 opens into a skim well 430. The skim well 430 is in fluid communication with the molten metal bath 405 via an archway 432. Molten metal flows from the vessel 200 and into the skim well 430 through the outlet channel 260. Dross and oxide can be skimmed from the molten metal in the skim well 430. The molten metal flows to the molten metal bath 300 from the skim well 430 through archway 432.

Scrap metal can be delivered into the skim well 25 and/or charge well 20 through an open top in either compartment. In the present exemplary embodiment, the skim well 430 is substantially rectangular, though the skim well 430 can be any desired size, shape, and configuration. For example, the skim well 430 may be square, round, or any other geometric shape. In addition, rather than having an opening at the top of the vessel 200 or skim well 430 for receiving scrap metal, either the vessel 200 or skim well 430 could have a lid (as described above) and/or an opening on a sidewall of the vessel 200 or skim well 430 for introducing scrap metal.

The particular implementations shown and described above are illustrative of preferred embodiments of the invention and are not intended to limit the scope of the present invention in any way.

Having thus described different embodiments of the invention, other variations, and embodiments that do not depart from the spirit thereof will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired product or result.

What is claimed is:

1. A scrap submergence vessel comprising:
   a bottom surface;
   an open top into which solid scrap metal is placed;
   a front wall comprising an inlet;
   a back wall opposite the front wall, the back wall comprising an outlet that is offset from the inlet;
   a flow direction member positioned at least partially on the bottom surface, the flow direction member configured to cause molten metal flowing into the inlet to be directed upward against an upper portion of the back wall and to the open top; and
   that does not include a scrap melter.

2. The scrap submergence vessel of claim 1 wherein the flow direction member comprises a curved bottom surface.

3. The scrap submergence vessel of claim 1 wherein the flow direction member comprises a separate structure partition extending from the bottom surface to the back wall.

4. The scrap submergence vessel of claim 1 wherein the back wall has a height, and the outlet is at least half the height of the back wall.

5. The scrap submergence vessel of claim 1 wherein the outlet is positioned closer to the bottom surface of the vessel than to the open top of the vessel.

6. The scrap submergence vessel of claim 1 wherein the inlet has a bottom side that is juxtaposed to the bottom surface.

7. The scrap submergence vessel of claim 1 further comprising:
   a first sidewall; and a second sidewall wherein the inlet is positioned closer to the first sidewall than the second sidewall, and the outlet is positioned closer to the second sidewall than the first sidewall.

8. A system for submerging scrap in a molten metal bath, the system comprising a molten metal pump having an outlet, the pump for generating a stream of molten metal through the outlet; and the vessel of claim 1.

9. The system of claim 8 wherein the flow direction member comprises a curved bottom surface for directing the flow of molten metal from the inlet upward against the portion of the back wall.

10. The system of claim 8 wherein the flow direction member comprises a partition extending from the back wall for directing the flow of the molten metal.

11. The system of claim 8 wherein the outlet comprises a channel in the back wall.

12. The system of claim 8 wherein the back wall has a height, and the outlet is formed in at least half the height of the back wall.

13. The system of claim 8 further comprising a skim well in fluid communication with the outlet .

14. The system of claim 8 wherein the outlet is positioned closer to the bottom surface of the vessel than to the open top of the vessel.

15. The system of claim 8 further comprising:
   a first sidewall; and
   a second sidewall, wherein the inlet is positioned closer to the first sidewall than the second sidewall, and the outlet is positioned closer to the second sidewall than the first sidewall.

16. The system of claim 8 wherein the vessel comprises at least a partially open top.

\* \* \* \* \*